United States Patent [19]

Pacht

[11] 3,986,523

[45] Oct. 19, 1976

[54] HIGH PRESSURE FLUID SYSTEM

[75] Inventor: Amos Pacht, Houston, Tex.

[73] Assignee: Partek Corporation of Houston, Houston, Tex.

[22] Filed: Oct. 9, 1974

[21] Appl. No.: 513,342

[52] U.S. Cl. .................................. 137/610; 239/443

[51] Int. Cl.[2] ............................................ F16K 1/00

[58] Field of Search ........... 239/124, 312, 443, 445, 239/446, 447; 251/368, 245, 244, 246; 137/610, 611, 612.1, 608; 222/318

[56] References Cited

UNITED STATES PATENTS

| | | | |
|---|---|---|---|
| 1,476,090 | 12/1923 | Lipsner et al. | 239/312 |
| 2,308,347 | 1/1943 | Asselin | 137/608 |
| 3,207,443 | 9/1965 | Gilmour | 239/312 |
| 3,298,396 | 1/1967 | Gressman et al. | 137/608 |
| 3,672,575 | 6/1972 | Hinrichs | 239/445 |
| 3,765,607 | 10/1973 | Pacht | 239/445 |
| 3,767,164 | 10/1973 | Robinson | 251/368 |
| 3,796,228 | 3/1974 | Bedo et al. | 251/368 |
| 3,831,845 | 8/1974 | Pacht | 137/612.1 |
| 3,885,739 | 5/1975 | Tuttle | 239/447 |

*Primary Examiner*—William R. Cline
*Assistant Examiner*—H. Jay Spiegel
*Attorney, Agent, or Firm*—Hubbard, Thurman, Turner & Tucker

[57] ABSTRACT

A high pressure fluid system is disclosed which includes a novel valve assembly having a single, relatively small, but effective sealing area to permit sealing of the valve assembly by application of a relatively small sealing force. Various forms of manual and powered triggering mechanisms for operating the valve are also disclosed.

15 Claims, 7 Drawing Figures

HIGH PRESSURE FLUID SYSTEM

This invention relates to a high pressure fluid system and in one of its aspects to a novel valve assembly for use in such a system to control flow of fluid through a high pressure nozzle.

In the prior art, fluid systems are provided in which a high pressure stream of water, i.e., at pressures of 3,000 – 20,000 pounds or more, are used for many cleaning applications. In many of these systems a hand-held nozzle and valve assembly (somewhat like a gun with a nozzle at the end of the barrel) is provided, and it is connected by a hose to the outlet of the high pressure pump. The nozzle and valve assembly generally includes a valve housing, a barrel extension for directing the stream of water to the object to be cleaned and through the nozzle, a handle trigger mechanism or other triggering device, and a pressure relief or dump outlet for relieving pressure in the valve housing when flow through the high pressure nozzle is interrupted. An example of this type of apparatus is illustrated in U.S. Pat. No. 3,765,607 assigned to the assignee of this invention.

Since it may be necessary to switch fluid pressures in the order of 10,000 psi during operation of such an apparatus, a difficult problem is to design a valve providing effective sealing which may be switchecd rapidly without the necessity of applying a large force. Heretofore, in valve assemblies which were designed to handle high pressure fluid, it was common to provide relatively large sealing surfaces on the valve members to provide effective sealing, which as a consequence increased the force required to effect the sealing during use with higher pressures. As a result these prior art valve assemblies generally required separate pilot operated or primary valves to reduce the force required to switch the valve, which in many operations is done manually in adverse field conditions.

An important feature of the present invention is the recognition of a special relationship between the size of the sealing surface and the elastic properties of the sealing structure which permits design of high pressure valve assembly which provides effective sealing of relatively high pressure fluids without the need for relatively high sealing forces. For this purpose, the valve assembly includes a valve member and a valve seat which provide a sealing area when engaged to prevent the passage of high pressure fluid therethrough. In order to provide this relationship in accordance with this invention, the required sealing area of the valve assembly is generally determined by the formula $$\frac{F\text{-min}}{P} > A > \frac{F\text{-max}}{Sy} \qquad (1)$$

where $F$-min is the minimum force desired to provide sealing; $P$ is the fluid operating pressure; $A$ is the required sealing area; $F$-max is the maximum sealing force that may inadvertently occur; and $Sy$ is the yield point of the weakest material among the valve member and valve seat. By selecting valve components to provide a sealing area in accordance with the above recited formula only a single sealing surface may be required in the valve assembly for use with relatively high pressures and the need for pilot or primary valves is generally eliminated.

Also, the valve members are utilized as a dump valve with a relatively small part of the movable valve member (the sealing area) exposed to high pressure on one side of the valve, and the other side of the valve is exposed to a low or dump pressure (generally atmospheric) which is the pressure which opposes the closing of the valve. Thus, with the relatively small sealing area being the only part of the valve member exposed to high pressure, the forces opposing closure of the valve are reduced. Also, the portion of the valve exposed to the lower pressure can be made of weaker and cheaper parts than that portion exposed to the higher pressure.

The valve assembly of the present invention may be employed with various forms of manual triggering mechanisms for operating the valve mechanism, or an air assisted or other powered operator. Another important feature of the present invention is that the valve mechanism is simple and requires relatively few components so that it may be mounted in a simple housing that can be readily adapted to be connected to various kinds of manual (hand-held or foot operated) or powered triggering mechanisms for operating the valve assembly. Of course, since the closing force for the valve is substantially reduced by this invention, powered triggering mechanisms are required not to provide a higher closing force, but to permit the remote actuation of the valve. The different embodiments of the present invention illustrated and described herein are examples of this feature.

In the drawings, wherein like reference numerals are used throughout to designate like parts, and wherein preferred embodiments of the present invention are illustrated;

Figure 1:
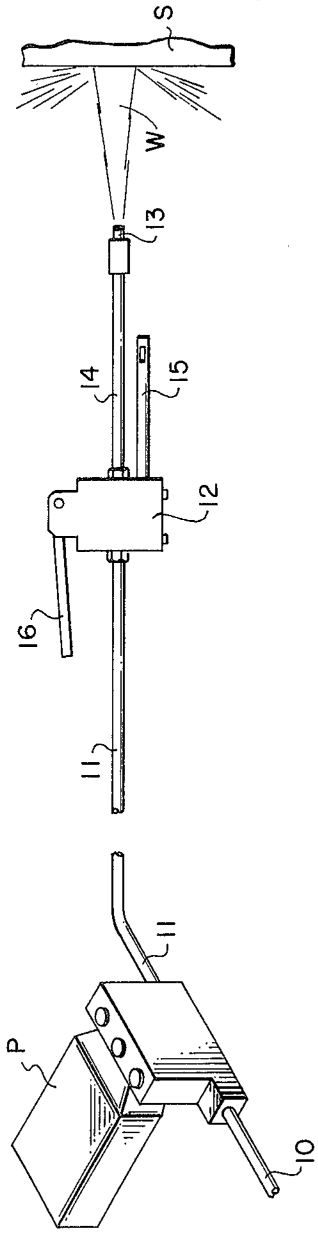
FIG. 1 is a perspective view of a high pressure, fluid-blasting system utilizing the present invention.

Referring now to FIG. 1, a high pressure pump P is illustrated as connected at its inlet 10 to a source of water (not shown) and its outlet to a hose 11 connected to a hand-held nozzle gun and valve assembly 12. A high presssure stream W of water emerges from the nozzle of assembly 12 to clean the surface of an object S, for example, the hull of a ship. The valve assembly 12 includes a relatively high pressure nozzle outlet 13 connected through a barrel 14 to assembly 12, and a relatively low pressure dump outlet conduit 15. Assembly 12 is manually actuated by lever 16 to divert flow between nozzle outlet 13 and dump outlet 15.

Figure 2B:
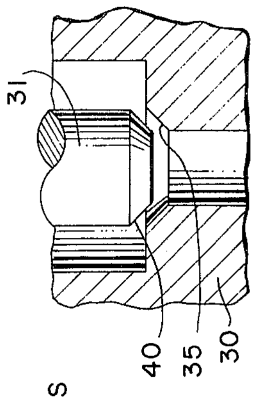
FIG. 2B is an enlarged view taken at 2B in FIG. 2A.
Figure 2A:
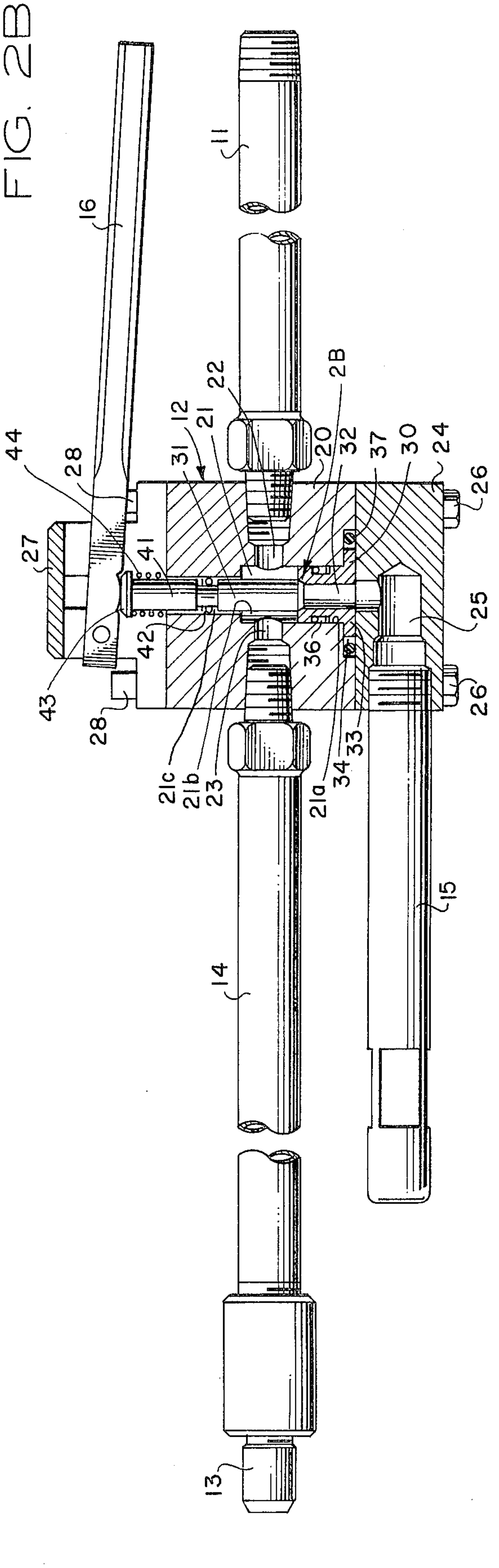
FIG. 2A is a view in elevation and partial section of a valve assembly of the present invention when utilized with a lever type manual actuator.

The details of valve assembly 12 are illustrated in FIGS. 2A and 2B. Assembly 12 includes a valve housing 20 which may be a metal block having a cylindrical central bore 21 passing through it. Bore 21 includes a relatively large diameter lower portion 21*a* and central portion 21*b*, and a smaller diameter upper portion 21*c* as illustrated in FIG. 2A. Lower portion 21*a* and central portion 21*b* of passageway 21 generally form a valve chamber in housing 20, with a valve seat member mounted in lower portion 21*a* as to be described. Connected into central portion 21*b* of passageway 21, on opposite sides of housing 20, are a fluid inlet duct 22 and a relatively high pressure outlet duct 23. Ducts 22 and 23 are suitably threaded to receive threaded male portions of conduits 11 and 14 as illustrated in FIG. 2A. A second metal block 24 is mounted on the bottom of housing 20 and includes a right-angle central bore 25 which is in line with the center of bore 21 in housing 20 at one end, and provides connection to conduit 15 through suitable threads at the other end. Block 24 may be mounted on housing 20 through bolts 26, so bore 25 is in communication with valve chamber 21 and inlet 22.

A valve operating mechanism 27 including lever 16 is mounted on top of housing 20 as illustrated in FIG. 2A by suitable bolts 28.

A valve mechanism including a valve seat member 30 and a valve stem member 31 is mounted in bore 21 to respond to the actuation of lever 16 to divert flow between nozzle 13 where it emerges from valve assembly 12 at a relatively high pressure, i.e., 3,000 to 20,000 psi, to conduit 15 where it is dumped at a relatively low pressure, such as atmospheric pressure. Valve seat member 30 includes a central bore 32 and is mounted in the lower portion 21*a* of central bore 21. For this purpose, valve seat member 30 includes an outward extending lower lip 33 which fits into a recess 34 formed about the lower end of bore 21, and the upper end of valve seat member 30, and the upper end of central bore 32, includes a tapered sealing surface 35. A recess may be provided intermediate the ends of member 30, into which a suitable seal 36 including an O-ring and a back up ring may be mounted to seal between the outer wall of member 30 and the inner wall of bore 21. An O-ring seal 37 also may be provided in recess 34 to provide a seal between blocks 20 and 24 to prevent the passage of fluid from bore 21 between the blocks.

Valve stem 31 includes a tapered lower surface providing a sealing surface 40, which along with sealing surface 35 provides the sealing area for sealing the valve means. Stem 31 extends into the upper portion 21*c* of bore 21, and is guided thereby, and includes an actuator portion 41 which extends from bore 21*c* into operating mechanism 27 to be actuated by lever 16 as illustrated in FIG. 2A. A suitable seal 42 is provided in a recess intermediate the ends of valve stem member 31 to provide a seal between the outer periphery of the valve stem member and the inner wall of section 21*c* of bore 21. Seal 42 may also include an O-ring and a back up ring for this purpose. The upper end of valve stem 31 is provided by an inverted dish-shaped member 43 having a greater diameter than portion 41 of stem 31, and a spring 44 is provided about the upper end of portion 41 of valve stem member 31 between dish 43 and the top of block 20, about the opening formed by bore 21, to normally urge valve stem 31 so that sealing surface 40 is off of sealing surface 35, and the valve is in the open position. In this manner, water flowing from inlet 11 into bore 21 will normally flow through the opening in the valve through the relatively unrestricted dump outlet 15, rather than through restricted nozzle 13. However, when the operator actuates lever 16 to close surface 40 against surface 35, flow is forced through nozzle 13 at a relatively high pressure, i.e., in the range of 3,000 to 20,000 pounds per square inch.

An important feature of the present invention is the recognition of a special relationship between the size of the sealing surfaces 35 and 40 and the elastic properties of the sealing structures 30 and 31 which permits design of high pressure valve assembly which provides effective sealing of relatively high pressure fluids without the need for relatively high sealing forces. In order to provide this relationship in accordance with this invention, the required sealing area of the valve assembly is generally determined by formula (1) above. As noted, by selecting valve components to provide a sealing area in accordance with this formula only a single sealing surface may be required in the valve assembly for use with relatively high pressures and the need for pilot or primary valves is generally eliminated.

In selecting the minimum force desired to provide effective sealing, this would normally be that which could be readily applied manually in some cases, or by a hydraulic or pneumatic actuator in other cases. Of course, as the sealing area is reduced, the maximum seat stress increases and the yield strength of the material must not be exceeded. In selecting the proper valve stem and valve seat material, it should not be so hard so as not to deform under normal sealing forces, as the deformation of the valve members, particularly the seat member, aids in obtaining a suitable seal. On the other hand, the valve stem and valve seat material must not be so soft that it will permanently deform when the maximum sealing force that may inadvertently occur is applied. A good, heat treated stainless steel is generally suitable and by way of example, suitable alloys for the valve stem and valve seat members are: 440-C S-S, 17-4 P.H. stainless steel, Stellite, tungsten carbide, and chrome plated steel.

As an example of the effectiveness of the present invention, a valve assembly of the configuration of FIG. 2A was tested for switching 10,000 psi tap water with an air cylinder utilized to actuate the valve. The valve stem and valve seat members were made of 17-4 P.H. stainless steel having an effective yield strength of 185,000 psi. The internal bore of the valve seat member was successfully reduced in size to decrease the effective sealing area and the valve and seat tape angles were toleranced so that the sealing took place on the smallest part of the taper so that the worst condition (maximum sealing force required) was encountered. Minimum force to seal was determined when the dump outlet quit dripping water.

The results recorded were as follows:

| Data Point | Seat Bore Dia. | Pin Dia. | Sealing Area (In.$^2$) | Actual Sealing Force (lb) | Theoretical Sealing Force (lb) | Max. Seat Stress |
|---|---|---|---|---|---|---|
| 1 | 0.4430 | 0.4965 | 0.0395 | 353 | 429 | 21,487 |
| 2 | 0.4635 | 0.4965 | 0.0249 | 283 | 284 | 34,091 |

-continued

| Data Point | Seat Bore Dia. | Pin Dia. | Sealing Area (In.$^2$) | Actual Sealing Force (lb) | Theoretical Sealing Force (lb) | Max. Seat Stress |
|---|---|---|---|---|---|---|
| 3 | 0.4730 | 0.4965 | 0.0179 | 212 | 214 | 47,403 |
| 4 | 0.4850 | 0.4965 | 0.0089 | 127 | 127 | 95,683 |
| 5 | 0.4900 | 0.4965 | 0.0050 | 95 | 85 | 168,428 |

where:

$$\text{Sealing Area} = \pi \frac{(\text{Valve stem Dia.})^2 - (\text{Seat Bore Dia.})^2}{4} \quad (2)$$

$$\text{Theoretical Sealing Force} = \pi \frac{(\text{Valve stem dia.})^2 - (\text{Seat Bore Dia.})^2}{4} \times (\text{Fluid Pressure}) \quad (3)$$

$$\frac{\text{Maximum Seat}}{\text{Stress}} = \frac{\text{Sealing Force}}{\text{Sealing Area}} \quad (4)$$

Figure 4:
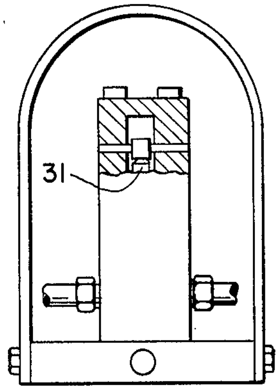
FIG. 4 is an end view of the apparatus of FIG. 3.
Figure 3:
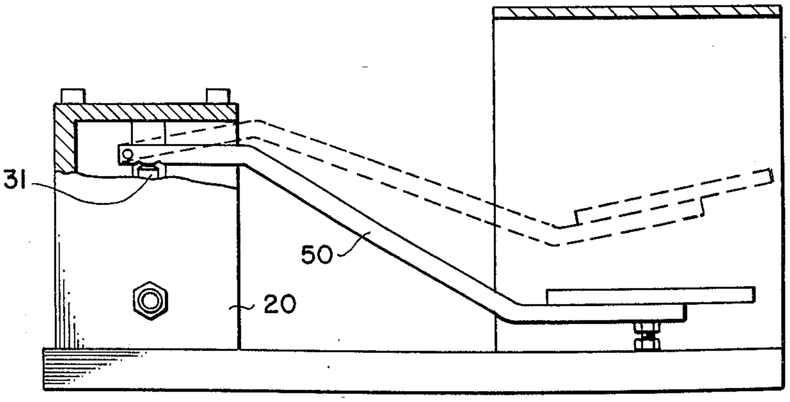
FIG. 3 is a view in elevation and partial section illustrating the use of the valve assembly of the present invention with a foot operated valve operator.
Figure 5:
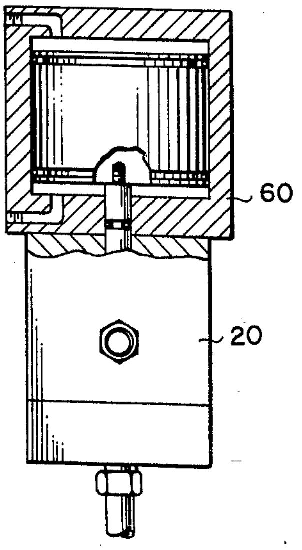
FIG. 5 is a view in elevation and partial section illustrating the use of the valve assembly of the present invention with a pneumatically controlled operator attached thereto.
Figure 6:
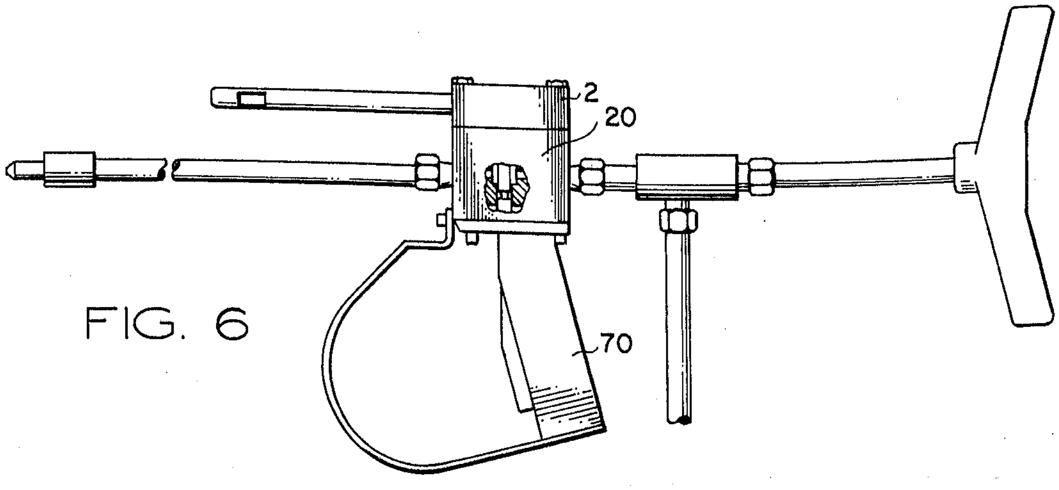
FIG. 6 is a view in elevation of a hand-held valve and nozzle assembly utlizing the valve structure of the present invention with a pistol grip type of valve operator.

Thus, in accordance with this invention, when high pressure fluid in excess of 3,000 psi is switched by a dump valve, it is desirable to provide substantially the minimum effective sealing area for a given applied force, without exceeding the yield strength of the sealing surface material, to permit relatively low switching forces. Also, the resulting requirement for a small, single sealing area and the fact that a pilot actuator or primary valve is not required permits the construction of a valve in a small housing with a minimum number of parts and facilitates the provision of a valve housing which is adaptable for permitting the mounting of a number of different devices for actuating the valve as illustrated by FIGS. 2A and 3 – 6. In FIGS. 3 and 4, valve housing 20 is illustrated as including a foot operated valve actuator 50 mounted thereon. In FIG. 5, an air operated actuator 60 is illustrated as being mounted on valve housing 20, and in FIG. 6, a pistol grip actuator 70 is illustrated as being mounted on valve housing 20 for the actuation of valve stem 31. FIGS. 2A and 3 – 6 are examples of the various styles of actuators that can be mounted on housing 20 without the necessity of modifying the housing or the valve components. It should be apparent that by providing a structure that can switch relatively large fluid pressures with the application of relatively small forces that the different switching means described herein can be provided with little or no modification of the basic valve structure.

Also, by utilizing formula (1) to design and size the valve members, the "kick" generally associated with switching relatively high pressure fluids is substantially reduced so that it is not necessary to provide a muffler at the dump outlet to reduce kick. Since the elastic properties of the valve member are utilized in providing an effective seal, leakage problems due to wear are substantially reduced and many successive cycles of operation may be provided with little or no maintenance.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. High pressure fluid blasting apparatus, comprising in combination:

a housing have a valve chamber therein;

inlet means in said housing in communication with said valve chamber and adapted to be connected to a source of fluid;

a relatively high pressure outlet means in said housing in communication with said valve chamber for providing a relatively high pressure fluid blast at fluid pressures greater than about 3000 p.s.i.;

a relatively low pressure outlet means in said housing in communication with said valve chamber for providing for the dumping of fluid at a substantially lower fluid pressure than the pressure of said high pressure fluid flow; and valve means disposed in said chamber for selectively changing the flow of fluid from said inlet to and between said outlet means, said valve means including a valve stem member and a valve seat member having a single, relatively small but effective sealing area defined generally by the relationship $$\frac{F\text{-min}}{P} > A > \frac{F\text{-max}}{Sy}$$

where $F$-min is the minimum force desired to provide closure of said valve means, $P$ is the fluid operating pressure, $A$ is the required sealing area, $F$-max is the maximum sealing force that may inadvertently occur, and $Sy$ is the yield point of the weakest material of the valve means to permit sealing of the valve means by application of a relatively small sealing force such that the valve means may be manually operated to close said sealing area, said sealing area being small enough to permit elastic deformation of the sealing surfaces a sufficient amount to prevent leakage therebetween at said relatively high pressures but large enough to prevent yielding of the sealing surface during sealing of fluid at said relatively high pressure and actuating means adapted to be directly in contact with one end of said valve stem member to permit direct actuation of said valve means without pilot assist even when said valve means is controlling fluid at said relatively high pressures.

2. The fluid blasting apparatus of claim 1 wherein the valve means is made of a heat treated stainless steel.

3. The fluid blasting apparatus of claim 1 wherein the valve means is made of a heat treated stainless steel.

4. The fluid blasting apparatus of claim 1 wherein said valve means includes a valve stem member and a valve seat member having mating tapered faces to provide said sealing area.

5. The fluid blasting apparatus of claim 4 wherein said valve stem member and said valve seat member are made of a heat treated stainless steel.

6. The fluid blasting apparatus of claim 1 wherein said valve means includes an elongated valve stem member extending from said valve chamber to the outside of said housing so that the valve stem member can be actuated to actuate said valve means, and further including actuating means for so actuating said valve stem member.

7. The fluid blasting aparatus of claim 6 wherein said actuating means is a hand operated lever mounted on said housing for actuating said valve stem member.

8. High pressure fluid blasting apparatus, comprising in combination:

a housing including a first bore therethrough having a valve chamber therein and a second bore therethrough perpendicular to said first bore, said first bore including a first portion of a relatively small diameter extending from one side of said housing toward the center thereof, and a second portion of relatively larger diameter extending from the center of said housing to the opposite side of said housing to form said valve chamber, one end of said second bore forming an inlet means in communication with said valve chamber and adapted to be connected to a source of fluid, and the other end of said second bore forming a relatively high pressure outlet means in communication with said valve chamber for providing a relatively high pressure fluid blast at fluid pressures greater than about 3000 p.s.i.;

a relatively low pressure outlet means in said housing in communication with said valve chamber for providing for the dumping of fluid at a substantially lower fluid pressure than the pressure of said high pressure fluid flow; and valve means disposed in said chamber for selectively changing the flow of fluid from said inlet to and between said outlet means, including an elongated, removable, cylindrical valve stem member having a tapered sealing surface insertable into said first bore from said one side of said housing so that a portion of said valve stem member extends out of said first bore for actuation by a valve actuator, and said tapered sealing surface extends into said valve chamber and a removable valve seat member insertable into said first bore from said opposite side of said housing and having a tapered sealing surface adapted to mate with the sealing surface of said valve stem member to form a single, relatively small but effective sealing area defined generally by the relationship $$\frac{F\text{-min}}{P} \; A \; \frac{F\text{-max}}{Sy}$$

where $F$-min is the minimum force desired to provide closure of said valve means, $P$ is the fluid operating pressure, $A$ is the required sealing area, $F$-max is the maximum sealing force that may inadvertently occur, and $Sy$ is the yield point of the weakest material of the valve means to permit sealing of the valve means by application of a relatively small sealing force such that the valve means may be manually operated to close said sealing area, said sealing area being small enough to permit elastic deformation of the sealing surfaces a sufficient amount to prevent leakage therebetween at said relatively high pressures but large enough to prevent yielding of the sealing surface during sealing of fluid at said relatively high pressure, and actuating means adapted to be directly in contact with the end of said valve stem member extending out of said housing to permit direct actuation of said valve means without pilot assist even when said valve means is controlling fluid at said relatively high pressures.

9. The fluid blasting apparatus of claim 8 wherein said valve stem member has a smooth surface in the area thereof exposed to said relatively high pressure along its length to said tapered sealing surface.

10. The fluid blasting apparatus of claim 8 wherein said valve seat member includes a flow passage therethrough in fluid communication with said valve chamber when said valve means is open, and a flange portion of greater diameter than the body of said valve seat member, and wherein said first bore includes a third portion of larger diameter than said second portion and formed by a recess in the surface of said opposite side of said housing so that when said valve stem member is mounted in said first bore, said flange is disposed in said third portion of said bore, and further including a second housing removably mounted on said other side of said first mentioned housing to abut against said valve seat member to prevent said valve seat member from being dislodged from its position in said first bore, said second housing including a flow passageway therethrough in fluid communication with said flow passageway in said valve seat member to provide said relatively low pressure outlet means.

11. The fluid blasting apparatus of claim 10 wherein said valve stem member has a smooth surface in the area thereof exposed to said relatively high pressure along its length to said tapered sealing surface.

12. The fluid blasting apparatus of claim 10 further including seal means between said housings.

13. The fluid blasting apparatus of claim 10 wherein said flow passageway through said second housing makes a right angle bend to permit dumping of said relatively low pressure fluid away from an operator.

14. The fluid blasting apparatus of claim 13 further including seal means between said housings.

15. The fluid blasting apparatus of claim 14 wherein said valve stem member has a smooth surface in the area thereof exposed to said relatively high pressure along its length to said tapered sealing surface.

* * * * *